(12) United States Patent
Arnold et al.

(10) Patent No.: US 9,765,687 B2
(45) Date of Patent: Sep. 19, 2017

(54) TURBOCHARGER WITH VARIABLE-VANE TURBINE NOZZLE HAVING A GAS PRESSURE-RESPONSIVE VANE CLEARANCE CONTROL MEMBER

(71) Applicant: Honeywell International Inc., Morristown, NJ (US)

(72) Inventors: Philippe Arnold, Hennecourt (FR);
Denis Jeckel, Thaon les Vosges (FR);
Peter Rhys Davies, Grandvillers (FR);
Christophe Riviere, Aydoilles (FR);
Gregory Do, Aydoilles (FR);
Dominique Petitjean, Julienrupt (FR);
Shankar Pandurangasa Solanki, Karnataka (IN)

(73) Assignee: Honeywell International Inc., Morris Plains, NJ (US)

( * ) Notice: Subject to any disclaimer, the term of this patent is extended or adjusted under 35 U.S.C. 154(b) by 556 days.

(21) Appl. No.: 14/264,848

(22) Filed: Apr. 29, 2014

(65) Prior Publication Data
US 2015/0308330 A1    Oct. 29, 2015

(51) Int. Cl.
*F02B 37/24* (2006.01)
*F01D 17/16* (2006.01)

(52) U.S. Cl.
CPC ............. *F02B 37/24* (2013.01); *F01D 17/165* (2013.01); *F05D 2230/54* (2013.01)

(58) Field of Classification Search
CPC ................................ F01D 17/165; F02B 37/24
See application file for complete search history.

(56) References Cited

U.S. PATENT DOCUMENTS 2,976,013 A    3/1961  Hunter
3,033,519 A    5/1962  Radtke
(Continued)

FOREIGN PATENT DOCUMENTS

DE         10029640 A1 *   1/2002   ........... F01D 17/165
DE     102004038748 A1 *   2/2006   ............. F02B 37/24
(Continued)

OTHER PUBLICATIONS

Machine translation of German Patent Publication DE 102008034751 A1; Smatloch; patent publication published on Jan. 28, 2010.*

(Continued)

*Primary Examiner* — Mary A Davis
(74) *Attorney, Agent, or Firm* — John C. James

(57) ABSTRACT

A turbocharger includes a variable turbine nozzle formed between first and second walls. A variable-vane assembly has a fixed nozzle ring and a plurality of circumferentially spaced vanes disposed in the nozzle and rotatably mounted on the nozzle ring such that the vanes are pivotable. The nozzle ring defines the first wall of the turbine nozzle, each vane having a first end adjacent the first wall and a second end adjacent the second wall. The second wall of the turbine nozzle is formed by a gas pressure-responsive member that is arranged to be axially movable relative to the vanes. A first stop is positioned so that the gas pressure-responsive member is urged against the first stop by a differential gas pressure exerted on the gas pressure-responsive member so that there is a non-zero first value for a clearance between the second ends of the vanes and the second wall of the turbine nozzle.

10 Claims, 13 Drawing Sheets

(56) References Cited

U.S. PATENT DOCUMENTS

| | | | |
|---|---|---|---|
| 5,183,381 A | 2/1993 | McKean | |
| 6,168,375 B1 | 1/2001 | LaRue et al. | |
| 6,203,272 B1 | 3/2001 | Walsham | |
| 6,810,666 B2 * | 11/2004 | Lutz | F01D 17/167 415/158 |
| 7,794,200 B2 | 9/2010 | Mukherjee | |
| 8,333,556 B2 | 12/2012 | Hettinger et al. | |
| 8,485,779 B2 | 7/2013 | Matsuyama | |
| 8,590,305 B2 | 11/2013 | Anschel et al. | |
| 8,601,812 B2 | 12/2013 | Parker | |
| 2004/0112052 A1 | 6/2004 | Koch et al. | |
| 2013/0036733 A1 * | 2/2013 | Severin | F01D 17/165 60/605.1 |
| 2014/0311159 A1 * | 10/2014 | Ikegami | F01D 17/165 60/793 |

FOREIGN PATENT DOCUMENTS

| | | |
|---|---|---|
| DE | 102008034751 A1 | 1/2010 |
| EP | 2 573 363 A2 | 3/2013 |
| EP | 2759687 A1 | 7/2014 |
| JP | 5118767 B1 | 1/2013 |
| WO | WO 2004/027218 A1 | 4/2004 |

OTHER PUBLICATIONS

EPO Search and Opinion for EP Appl. No. 15163602.4, dated Sep. 21, 2015.

Inoue, et al.; "Development of VGS Unit (STEP4) for RHV4 Turbocharger"; IHI Engineering Review; vol. 44, No. 2; pp. 1-6; 2011.

* cited by examiner

TURBOCHARGER WITH VARIABLE-VANE TURBINE NOZZLE HAVING A GAS PRESSURE-RESPONSIVE VANE CLEARANCE CONTROL MEMBER

BACKGROUND OF THE INVENTION

This application relates generally to turbochargers for internal combustion engines, and relates more particularly to exhaust gas-driven turbochargers having a variable vane assembly in the nozzle for the turbine in order to regulate exhaust gas flow into the turbine.

Exhaust gas-driven turbochargers employ a turbine to extract power from the stream of exhaust gas coming from an internal combustion engine and use that power to drive a compressor in order to boost the pressure of the air supplied to the cylinders. Because it is often desired to have control over the degree of boost, it is common to employ some type of variable geometry mechanism in the turbine for regulating the flow of exhaust gas to the turbine wheel. One type of variable geometry mechanism employs an array of movable vanes disposed in the turbine nozzle through which the exhaust gas is fed to the turbine wheel. The vanes can be pivoted about respective pivot axes so as to vary an effective flow area and flow direction for the exhaust gas stream into the turbine wheel.

In some such variable-vane assemblies, the vanes are pivotally mounted to a nozzle ring that forms one wall of the turbine nozzle. The opposite wall of the nozzle is sometimes formed by the turbine housing itself, or alternatively can be formed by a pipe or insert that is formed separately from the turbine housing and is mounted in the turbine housing. The present disclosure concerns primarily variable-vane assemblies of the latter type.

The clearances between the ends of the vanes and the adjacent nozzle walls, formed by the nozzle ring and the pipe or insert, are important parameters influencing the overall efficiency of the turbine. Leakage of exhaust gas between the ends of the vanes and the adjacent walls (i.e., leakage through the vane clearances) generally results in a reduction in turbine efficiency. Additionally, leakage between the pipe or insert and the turbine housing further reduces efficiency, since that leakage flow does not pass through the turbine wheel and thus is unavailable for power extraction by the wheel. The performance penalty associated with these leakage flows is particularly troublesome at low engine speeds where the exhaust gas energy is already relatively low.

SUMMARY OF THE DISCLOSURE

The present disclosure describes turbocharger variable-vane assemblies that, in some embodiments, have features for controlling the vane clearances, with the aim to mitigate some of the clearance-related performance penalty. Other embodiments additionally or alternatively include features for mitigating the leakage flow between the pipe or insert and the turbine housing so as to try to mitigate some of the leakage flow-related performance penalty.

In accordance with one embodiment disclosed herein, a turbocharger comprises a compressor comprising a compressor housing and a compressor wheel disposed in the compressor housing, a turbine housing defining a bore extending axially through the turbine housing and defining an exhaust gas inlet and an annular chamber that receives exhaust gas via the exhaust gas inlet, the chamber extending circumferentially about the bore, and a turbine wheel disposed within the turbine housing and arranged for receiving exhaust gas from the chamber and expanding the exhaust gas and discharging the exhaust gas into the bore, the compressor wheel and the turbine wheel being affixed to opposite ends of a shaft.

The turbine includes a turbine nozzle extending from the chamber generally radially inwardly to the turbine wheel, the turbine nozzle being defined between a first wall and a second wall axially spaced wall from the first wall, and a contour adjacent a radially outer periphery of the turbine wheel and transitioning from the turbine nozzle into the bore.

The turbocharger further comprises a variable-vane assembly comprising a fixed nozzle ring and a plurality of circumferentially spaced vanes rotatably mounted on the nozzle ring such that the vanes are each rotatable about respective vane pivot axes, the nozzle ring defining the first wall of the turbine nozzle, the vanes being disposed in the turbine nozzle, each vane having a first end adjacent the first wall and a second end adjacent the second wall.

The second wall of the turbine nozzle is formed by a gas pressure-responsive member that is arranged to be axially movable relative to the vanes. There is a first stop positioned so that the gas pressure-responsive member is urged against the first stop by a differential gas pressure between a side of the gas pressure-responsive member adjacent the vanes and an opposite side of the gas pressure-responsive member, so that there is a non-zero first value for a clearance between the second ends of the vanes and the second wall of the turbine nozzle.

In a particular embodiment described herein, the gas pressure-responsive member comprises a pipe having a tubular portion that extends axially and an annular flange portion that extends generally radially outwardly from one end of the tubular portion, the flange portion forming the second wall of the turbine nozzle, the pipe forming said contour. The gas pressure-responsive member further comprises an elastic member affixed to the pipe and disposed between the pipe and a portion of the turbine housing, wherein one side of the elastic member is exposed to exhaust gas from the chamber in a substantially stagnated state, which exerts pressure on the elastic member to increase a contact force between the elastic member and the portion of the turbine housing and to urge the pipe against the first stop.

The elastic member can be affixed to the tubular portion of the pipe. For example, the elastic member can be press-fit onto the tubular portion.

Advantageously the elastic member is a resilient metal part.

In one embodiment the elastic member has one end affixed to the pipe and an opposite end that engages the portion of the turbine housing.

In a particular embodiment the elastic member is generally annular having a radially outer edge and a radially inner edge, and wherein said one end of the elastic member is defined by the radially inner edge and said opposite end of the elastic member is defined by the radially outer edge.

In some embodiments the elastic member is pre-compressed between the turbine housing and the pipe so as to urge the pipe toward the first stop in the absence of differential gas pressure on the pipe.

The first stop can be provided by spacers rigidly affixed to the nozzle ring and extending generally axially from the nozzle ring toward the flange portion of the pipe. In some embodiments each spacer can extend through an opening in the flange portion of the pipe.

The spacers can define a second stop for the flange portion, the flange portion being limited in axial movement away from the first stop by abutment against the second stop.

In the embodiments employing the pipe in combination with the elastic member, the pipe can be substantially rigid. Alternatively, the pipe can be a stamped sheet metal part.

In other embodiments disclosed herein, the gas pressure-responsive member comprises an elastically resilient pipe having a tubular portion that extends axially and an annular flange portion that extends generally radially outwardly from one end of the tubular portion, the flange portion forming the second wall of the turbine nozzle, the pipe forming said contour. The flange portion is resiliently deformable by said differential gas pressure so as to urge the flange portion toward the first stop.

In these embodiments the tubular portion of the pipe is rigidly affixed to the turbine housing. For example, the tubular portion can be press-fit into a portion of the bore in the turbine housing. In a particular embodiment disclosed herein, said portion of the bore defines an axially facing hard stop for an opposite end of the tubular portion from the end from which the flange portion extends, and the opposite end of the tubular portion abuts the hard stop.

In these embodiments the first stop can be provided by spacers rigidly affixed to the nozzle ring and extending generally axially from the nozzle ring.

In still further embodiments disclosed herein, the gas pressure-responsive member comprises an annular elastically resilient insert abutting a surface defined by the turbine housing. The insert has one side adjacent the vanes and an opposite side, and the opposite side of the insert is exposed to exhaust gas from the chamber in a substantially stagnated state, which exerts pressure on the insert to increase a contact force between the insert and the turbine housing and to urge the insert against the first stop.

In these embodiments the turbine housing forms the contour that provides the transition from the turbine nozzle into the bore of the turbine housing.

The insert can comprise a sheet metal part.

The insert can include a bent portion forming a spring extending from the opposite side of the insert and abutting the surface of the turbine housing.

BRIEF DESCRIPTION OF THE DRAWINGS

Having described the present disclosure in general terms, reference will now be made to the accompanying drawing(s), which are not necessarily drawn to scale, and wherein.

DETAILED DESCRIPTION OF THE DRAWINGS

The present disclosure will now be described in fuller detail with reference to the above-described drawings, which depict some but not all embodiments of the invention(s) to which the present disclosure pertains. These inventions may be embodied in various forms, including forms not expressly described herein, and should not be construed as limited to the particular exemplary embodiments described herein. In the following description, like numbers refer to like elements throughout.

Figure 1:
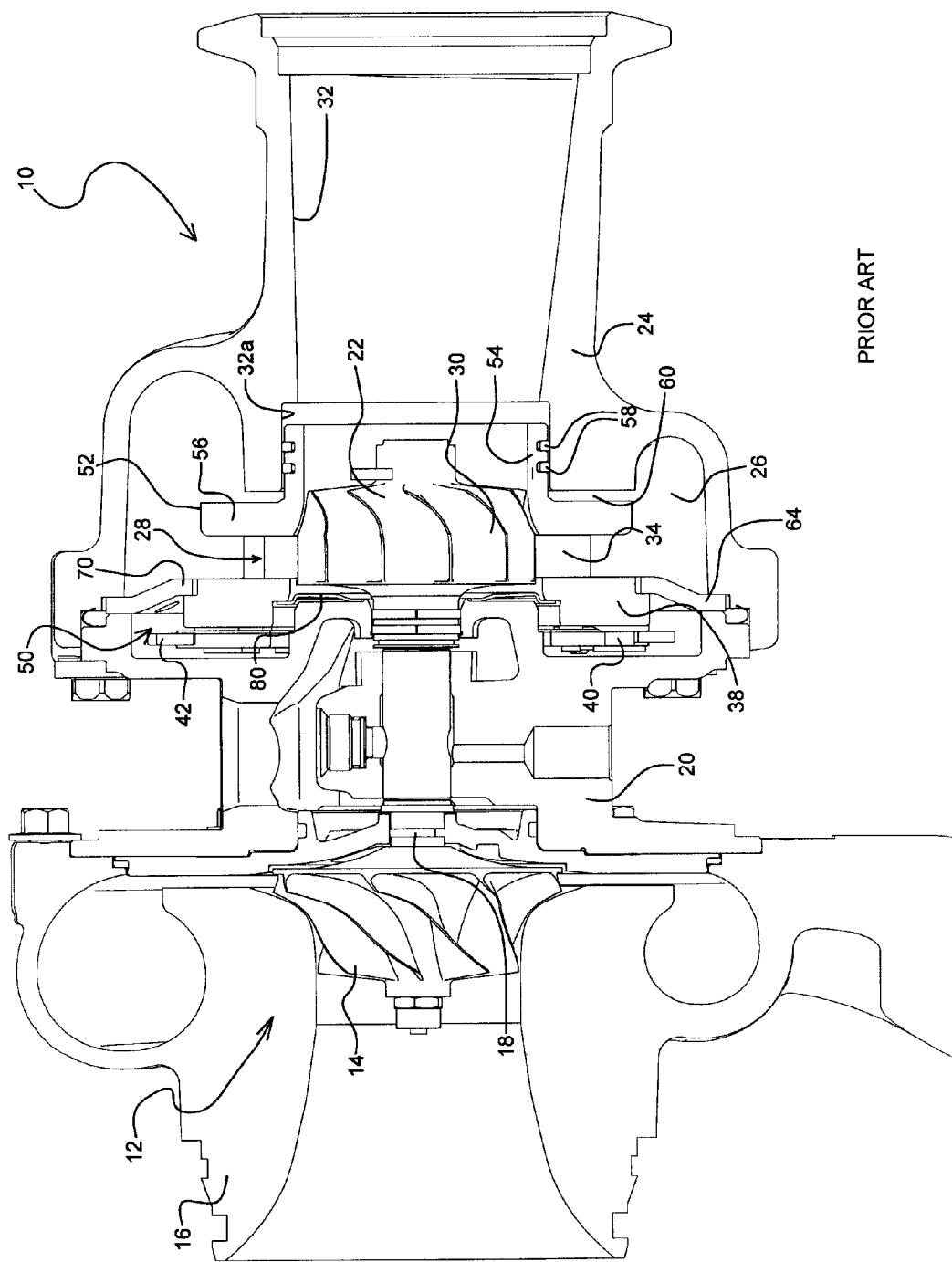
FIG. 1 is an axially sectioned side view of a turbocharger having a variable turbine nozzle arrangement in accordance with the prior art.

FIG. 1 illustrates a turbocharger 10 that is in accordance with the prior art but that is generally of the type to which the present invention can be applied. The turbocharger 10 is described in commonly owned U.S. Pat. No. 8,333,556 issued on Dec. 18, 2012, the entire disclosure of which is hereby incorporated herein by reference. The turbocharger comprises a compressor 12 having a compressor wheel or impeller 14 mounted in a compressor housing 16 on one end of a rotatable shaft 18. The shaft is supported in bearings (not specifically illustrated) mounted in a center housing 20 of the turbocharger. The shaft 18 is rotated by a turbine wheel 22 mounted on the other end of the shaft 18 from the compressor wheel, thereby rotatably driving the compressor wheel, which compresses air drawn in through the compressor inlet and delivers the compressed air to the intake of an internal combustion engine (not shown) for boosting the performance of the engine.

The turbocharger also includes a turbine housing 24 that houses the turbine wheel 22. The turbine housing defines a generally annular chamber 26 that surrounds the turbine wheel and that receives exhaust gas from the internal combustion engine for driving the turbine wheel. The exhaust gas is directed from the chamber 26 generally radially inwardly through a turbine nozzle 28 to the turbine wheel 22. As the exhaust gas flow through the passages between the blades 30 of the turbine wheel, the gas is expanded to a lower pressure, and the gas discharged from the wheel exits the turbine housing through a generally axial bore 32 therein.

The turbine nozzle 28 is a variable nozzle for varying the cross-sectional flow area through the nozzle so as to regulate flow into the turbine wheel. The nozzle includes a plurality of vanes 34 that are circumferentially spaced about the nozzle. Each vane is affixed to a pin (not shown) that passes through an aperture in a generally annular nozzle ring 38 that is mounted coaxially with respect to the turbine wheel 22. Each pin is rotatable about its axis for rotating the attached vane. The nozzle ring 38 forms one wall of the flow passage of the nozzle 28. Each of the pins has a vane arm 40 affixed to an end of the pin that protrudes out from the nozzle ring 38, and is engaged by a generally annular unison ring 42 (also referred to as an actuator ring) that is rotatable about its axis and that is coaxial with the nozzle ring 38. An actuator (not shown) is connected to the unison ring 42 for rotating it about its axis. When the unison ring is rotated, the vane arms 40 are rotated to cause the pins to rotate about their axes, thereby rotating the vanes 34 so as to vary the cross-sectional flow area through the nozzle 28.

The variable vane mechanism is provided in the form of a cartridge 50 that is installable into and removable from the turbocharger as a unit. The cartridge 50 comprises the nozzle ring 38, vanes 34, pins, vane arms 40, and unison ring 42. The cartridge further comprises a pipe or insert 52 that has a tubular portion 54 sealingly received into a portion 32a of the bore 32 of the turbine housing, and a nozzle portion 56 extending generally radially out from one end of the tubular portion 54, the nozzle portion 56 being axially spaced from the nozzle ring 38 such that the vanes 34 extend between the nozzle ring 38 and the nozzle portion 56. The bore portion 32a of the turbine housing has a radius that exceeds that of the remainder of the bore 32 by an amount slightly greater than the radial thickness of the tubular portion 54 of the insert 52. The radially outer surface of the tubular portion 54 has at least one circumferential groove, and preferably has two axially spaced grooves as shown in FIG. 1, in each of which a sealing ring 58 is retained for sealingly engaging the inner surface of the bore portion 32a. Advantageously, the outer diameter of the tubular portion 54 of the insert is slightly less than the inner diameter of the bore portion 32a so that a slight gap is defined therebetween, and only the sealing rings 58 make contact with the inner surface of the bore portion 32a. Additionally, there is a gap 60 between the nozzle portion 58 and the adjacent end of the turbine housing at the end of the bore portion 32a. In this manner, the insert 52 is mechanically and thermally decoupled from the turbine housing 24.

A plurality of spacers (not shown) are connected between the nozzle portion 56 of the insert 52 and the nozzle ring 38 for securing the nozzle ring to the insert and maintaining the desired axial spacing between the nozzle portion of the insert and the nozzle ring. Advantageously, the spacers are formed of a material having good high-temperature mechanical properties and a relatively low thermal conductivity, such as stainless steel (e.g., grade 310 stainless steel) or the like, so that the nozzle ring 38 and insert 52 are effectively thermally decoupled from each other.

The variable-vane cartridge 50 also comprises a generally annular retainer ring 64 clamped between the center housing 20 and turbine housing 24. The retainer ring 64 is formed as a separate part from the insert 52 and is mechanically and thermally decoupled from the insert. More specifically, the retainer ring comprises an annular ring that at its radially inner side has an annular radially inwardly extending projection 70 that engages the surface of the nozzle ring 38 facing toward the insert 52. The engagement between the projection 70 and the nozzle ring 38 preferably is along a full 360° circumference of the nozzle ring so as to substantially seal the interface between the retainer ring and the nozzle ring and to assist the spacers in restraining the nozzle ring with respect to axial movement in the direction toward the insert 52. Advantageously, there is a radial gap between the inner periphery of the retainer ring and the opposing surface of the nozzle ring. This gap accommodates radial displacement of the nozzle ring relative to the retainer ring, such as may occur through differential thermal growth or other causes. Additionally, there is a radial gap between the outer periphery of the retainer ring and the opposing surface of the turbine housing.

The cartridge 50 further comprises a heat shroud 80 that is captively retained between the nozzle ring 38 and the center housing 20 when the cartridge is installed onto the center housing. The heat shroud 80 provides sealing between the nozzle ring and center housing to prevent hot exhaust gas from migrating between these parts into the cavity in which the vane arms 40 and unison ring 42 are disposed. The heat shroud 80 advantageously is a resiliently elastic material such as spring steel or the like, and the shroud is configured so that it is compressed in the axial direction between the nozzle ring 38 and the center housing 20 so that the restoring force of the shroud urges the shroud firmly against surfaces of the nozzle ring and center housing to substantially seal against these surfaces.

Figure 2:
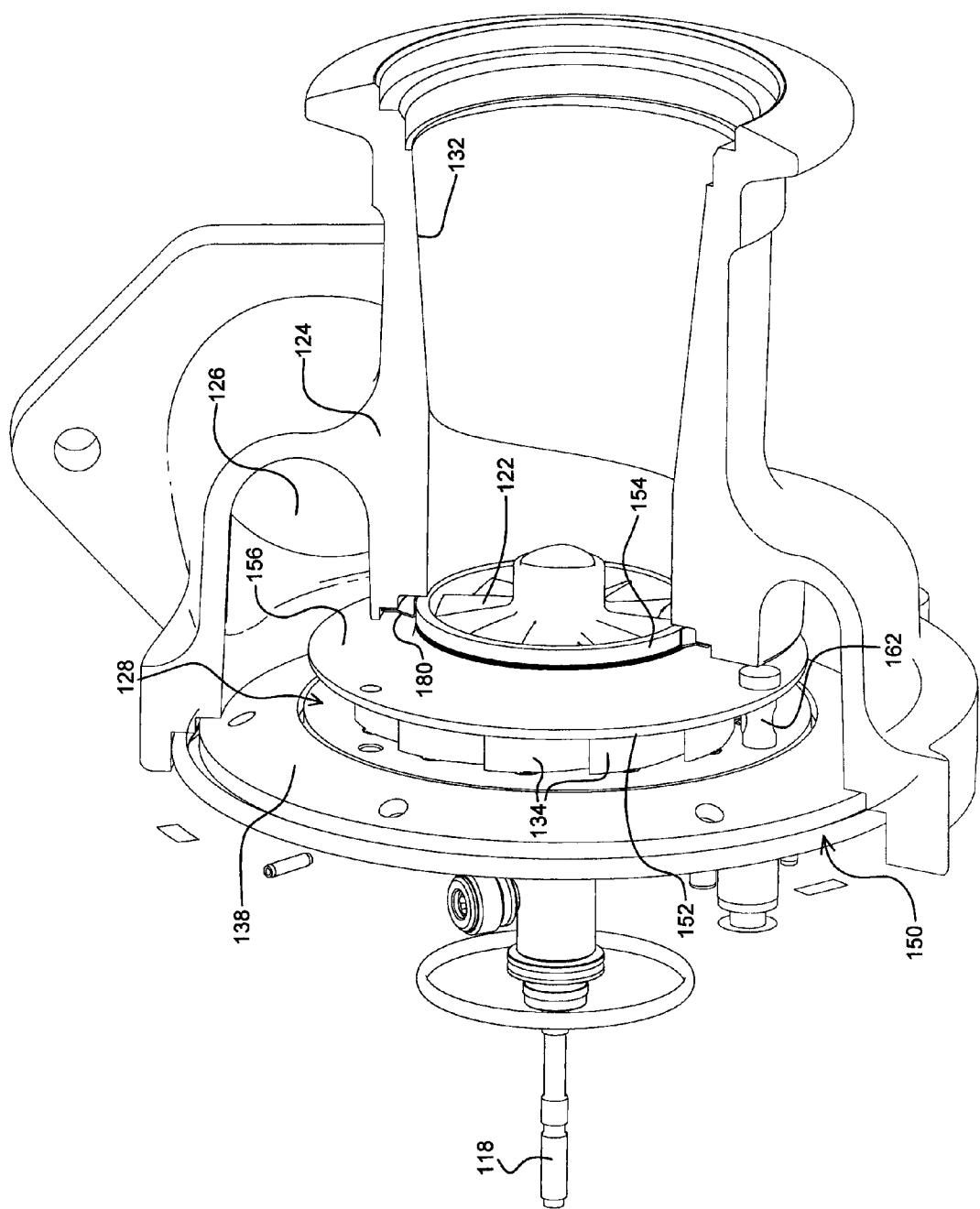
FIG. 2 is a partly sectioned perspective view of a turbocharger variable-nozzle turbine in accordance with a first embodiment of the invention.
Figure 3:
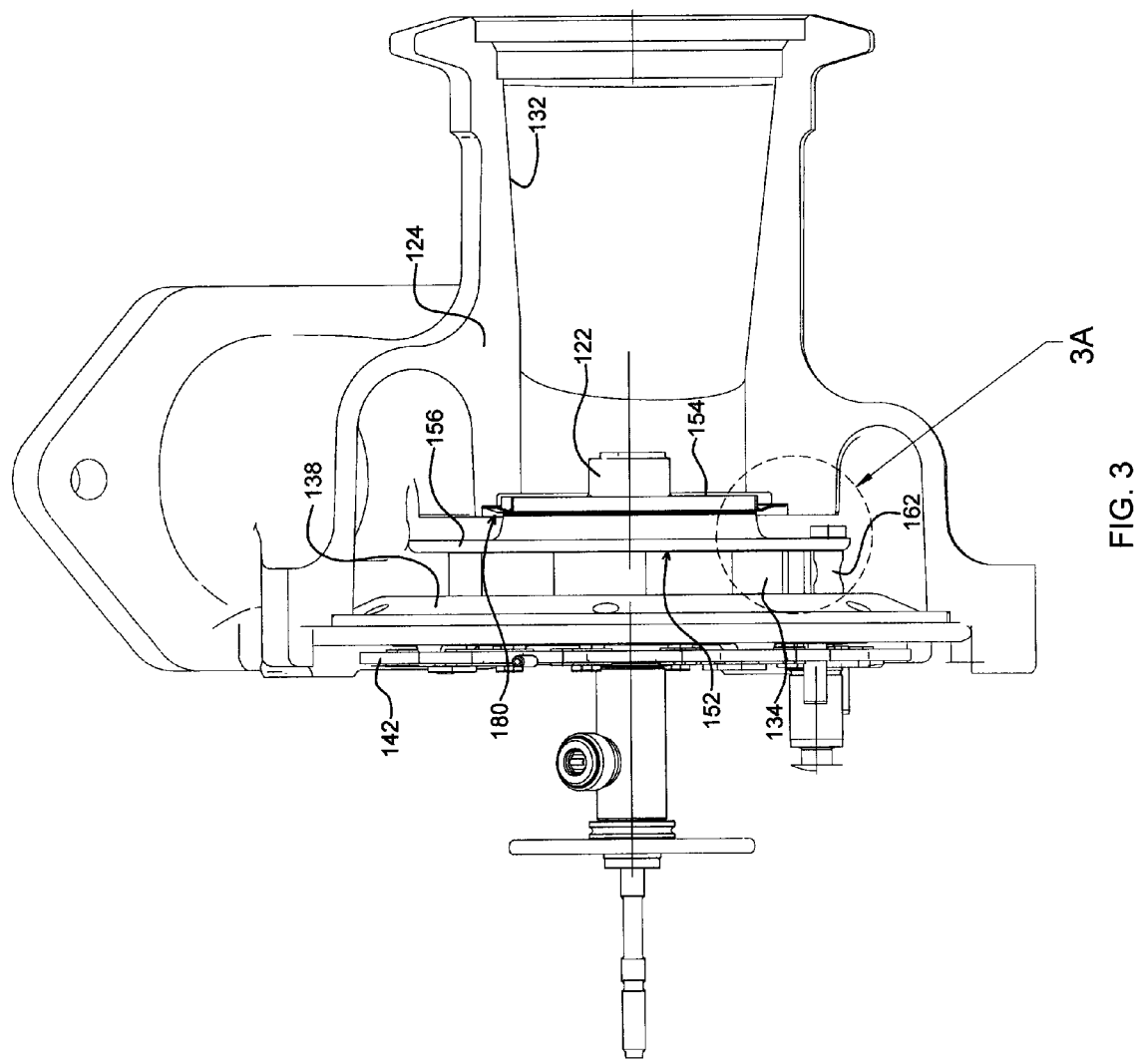
FIG. 3 is a side view, partly in section, of the variable-nozzle turbine of FIG. 2.
Figure 3A:
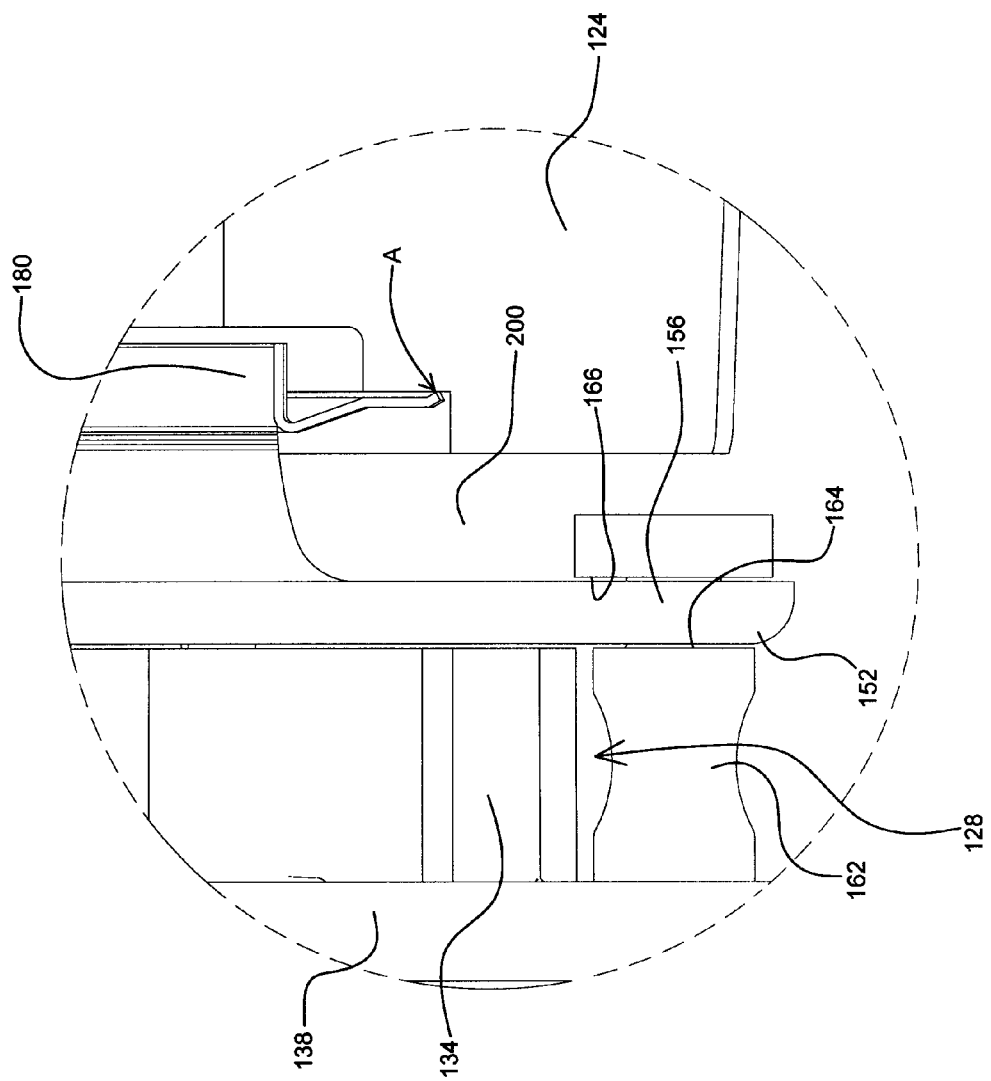
FIG. 3A is a magnified view of a portion of FIG. 3.

As noted, the present invention concerns an improvement to the type of variable-vane turbine nozzle assembly described in connection with FIG. 1. With reference to FIGS. 2, 3, and 3A, a first embodiment of the invention is now described. FIG. 2 depicts a turbine having a turbine wheel 122 mounted on a shaft 118 and disposed in a turbine housing 124 that defines a generally annular chamber 126. A turbine nozzle 128 leads from the chamber 126 radially inwardly to the turbine wheel. A variable-vane assembly or cartridge 150 is assembled with the turbine housing. The variable-vane assembly 150 includes a plurality of circumferentially spaced vanes 134 rotatably mounted to a nozzle ring 138 and actuated by a unison ring 142, and a pipe 152 connected to the nozzle ring by a plurality of spacers 162 circumferentially spaced about the nozzle.

The pipe 152 includes a tubular portion 154 that extends axially and an annular flange portion 156 that extends generally radially outwardly from one end of the tubular portion. The flange portion 156 forms one wall of the turbine nozzle 128 opposite from the wall formed by the nozzle ring 138. The pipe 152 also forms the contour that is radially adjacent to the outer tips of the blades of the turbine wheel 122. In accordance with the first embodiment of the invention, the pipe 152 is a gas pressure-responsive member that is arranged to be axially movable relative to the vanes 134 for controlling the clearance between the ends of the vanes 134 and the adjacent surface of the pipe 152. To this end, an elastic member 180 is affixed to the pipe 152 and is disposed between the pipe and a portion of the turbine housing 124. In particular, the elastic member 180 is a generally annular part that is affixed (e.g., by press-fitting) about the tubular portion 154 of the pipe such that the interface therebetween is effectively sealed. With reference to FIG. 3A, there is a dead-headed space 200 between the back side of the flange portion 156 of the pipe and the adjacent end of the turbine housing 124, and in this space the exhaust gas from the turbine housing chamber 126 is essentially stagnated such that its static pressure is higher than the static pressure of the exhaust gas flowing through the nozzle 128 on the front side of the flange portion 156. Accordingly, there is a gas pressure differential exerted on the flange portion 156 (directed to the left in FIG. 3A) that tends to urge the flange portion toward the ends of the vanes 134. In order to prevent the flange portion 156 from contacting the ends of the vanes, the spacers 162 define a shoulder or stop 164 that is abutted by the flange portion under the action of the gas pressure differential. When the flange portion abuts the stop 164 there is still a non-zero value of clearance between the flange portion and the ends of the vanes 134. Additionally, one side of the elastic member 180 is exposed to the stagnated exhaust gas in the space 200, while the opposite side of the elastic member is in communication with the exhaust gas flowing through the bore 132 (FIGS. 2 and 3), which is at a substantially lower static pressure. Thus there is a gas pressure differential across the elastic member 180, which exerts pressure on the elastic member to increase a contact force at the point A in FIG. 3A between the elastic member and the portion of the turbine housing, thereby helping to seal the interface between the elastic member and the turbine housing.

The elastic member 180 can be a resilient metal part. The elastic member has one end affixed to the pipe 152 and an opposite end that engages the portion of the turbine housing. In the illustrated embodiment the elastic member is generally annular having a radially outer edge and a radially inner edge, and the end of the elastic member affixed to the pipe is defined by the radially inner edge and the opposite end of the elastic member is defined by the radially outer edge.

Advantageously the elastic member 180 is pre-compressed between the turbine housing 124 and the pipe 152 so as to urge the pipe toward the stop 164 even in the absence of differential gas pressure on the pipe.

As best seen in FIG. 3A, each spacer 162 has a reduced-diameter portion that extends through an opening in the flange portion 156 of the pipe 152. The spacers also define a second stop 166 formed by enlarged heads on the ends of the reduced-diameter portions, such that the flange portion is limited in axial movement away from the first stop 164 by abutment against the second stop 166.

In accordance with the first embodiment of the invention, the pipe 152 can be substantially rigid, or alternatively can be a stamped sheet metal part having greater flexibility.

Figure 4:
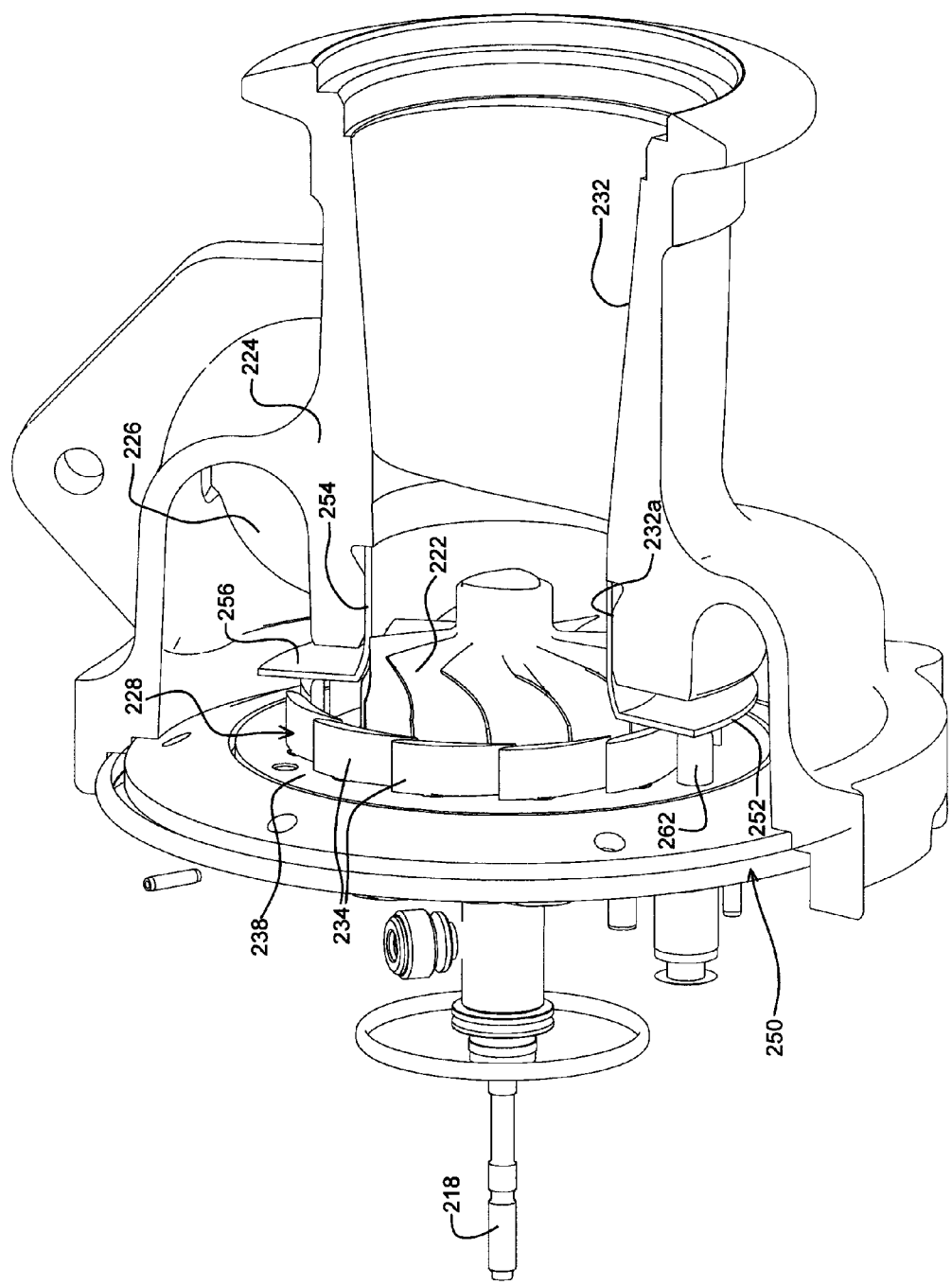
FIG. 4 is a partly sectioned perspective view of a turbocharger variable-nozzle turbine in accordance with a second embodiment of the invention.
Figure 5:
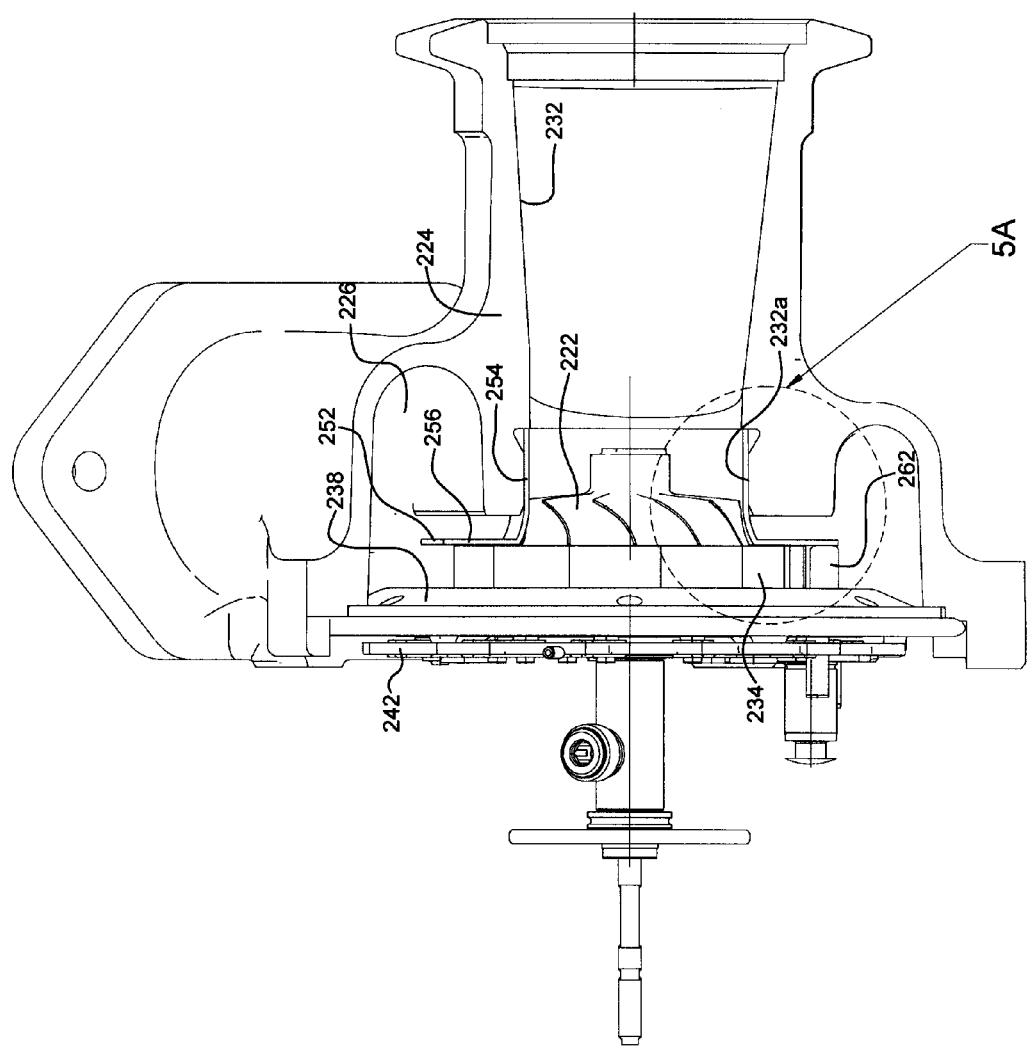
FIG. 5 is a side view, partly in section, of the variable-nozzle turbine of FIG. 4.
Figure 5A:
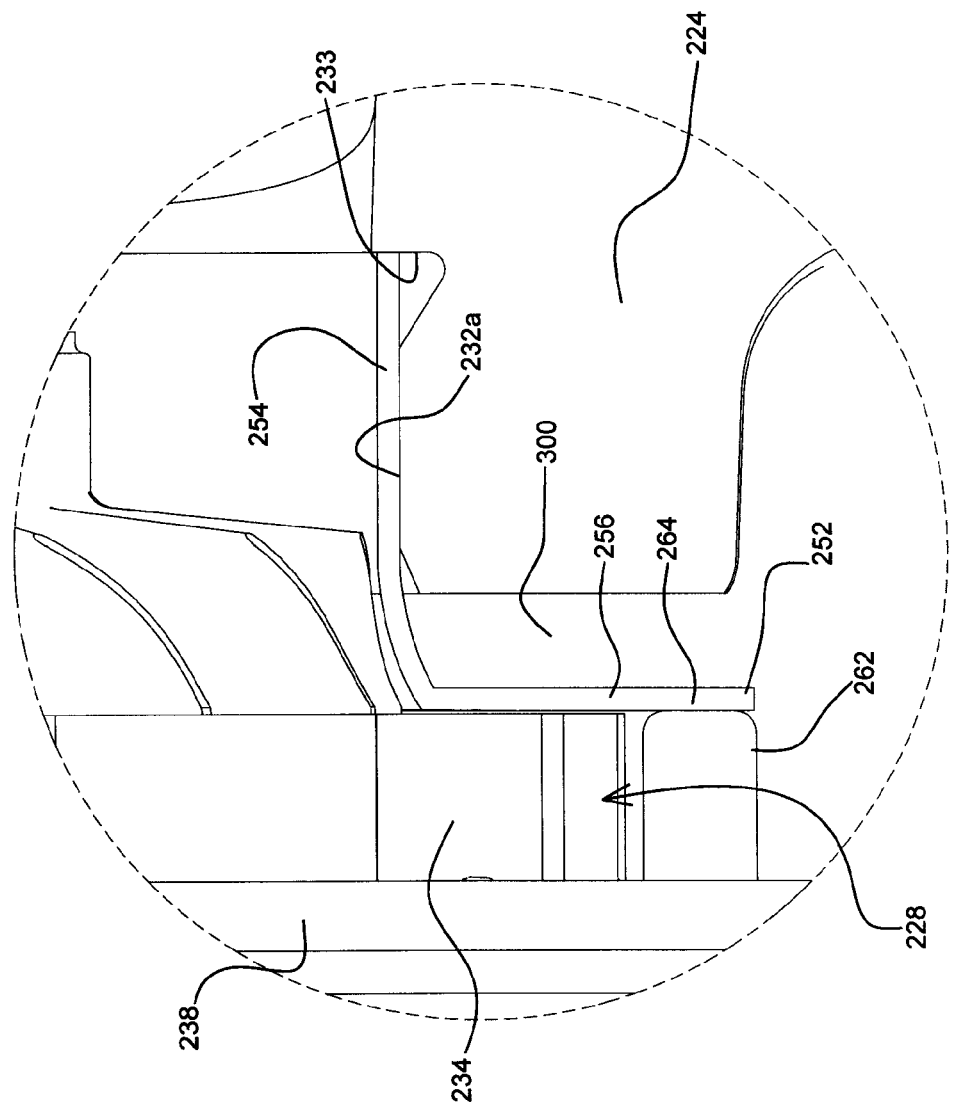
FIG. 5A is a magnified view of a portion of FIG. 5.

A second embodiment of the invention is illustrated in FIGS. 4, 5, and 5A. FIG. 4 depicts a turbine having a turbine wheel 222 mounted on a shaft 218 and disposed in a turbine housing 224 that defines a generally annular chamber 226. A turbine nozzle 228 leads from the chamber 226 radially inwardly to the turbine wheel. A variable-vane assembly or cartridge 250 is assembled with the turbine housing. The variable-vane assembly 250 includes a plurality of circumferentially spaced vanes 234 rotatably mounted to a nozzle ring 238 and actuated by a unison ring 242, and a pipe 252 inserted into a portion 232a of the bore 232 in the turbine housing.

The pipe 252 includes a tubular portion 254 that extends axially and is press-fit into the bore portion 232a, and an annular flange portion 256 that extends generally radially outwardly from one end of the tubular portion. The flange portion 256 forms one wall of the turbine nozzle 228 opposite from the wall formed by the nozzle ring 238. The pipe 252 also forms the contour that is radially adjacent to the outer tips of the blades of the turbine wheel 222. In accordance with the second embodiment of the invention, the pipe 252 is a gas pres sure-responsive member that is arranged to be axially movable relative to the vanes 234 for controlling the clearance between the ends of the vanes 234 and the adjacent surface of the pipe 252. To this end, the pipe 252 is elastic such that the flange portion 256 can undergo axial movement with respect to the vanes, under the action of differential gas pressure. With reference to FIG. 5A, there is a dead-headed space 300 between the back side of the flange portion 256 of the pipe and the adjacent end of the turbine housing 224, and in this space the exhaust gas from the turbine housing chamber 226 is essentially stagnated such that its static pressure is higher than the static pressure of the exhaust gas flowing through the nozzle 228 on the front side of the flange portion 256. Accordingly, there is a gas pressure differential exerted on the flange portion 256 (directed to the left in FIG. 5A) that tends to urge the flange portion toward the ends of the vanes 234. In order to prevent the flange portion 256 from contacting the ends of the vanes, there are spacers 262 mounted on the nozzle ring 238, and the spacers define a shoulder or stop 264 that is abutted by the flange portion under the action of the gas pressure differential. When the flange portion abuts the stop 264 there is still a non-zero value of clearance between the flange portion and the ends of the vanes 234.

As best seen in FIG. 5A, the portion 232a of the bore into which the tubular portion 254 of the pipe is press-fit defines an axially facing hard stop 233 for the end of the tubular portion opposite from the end from which the flange portion 256 extends, and the opposite end of the tubular portion abuts the hard stop.

Figure 6:
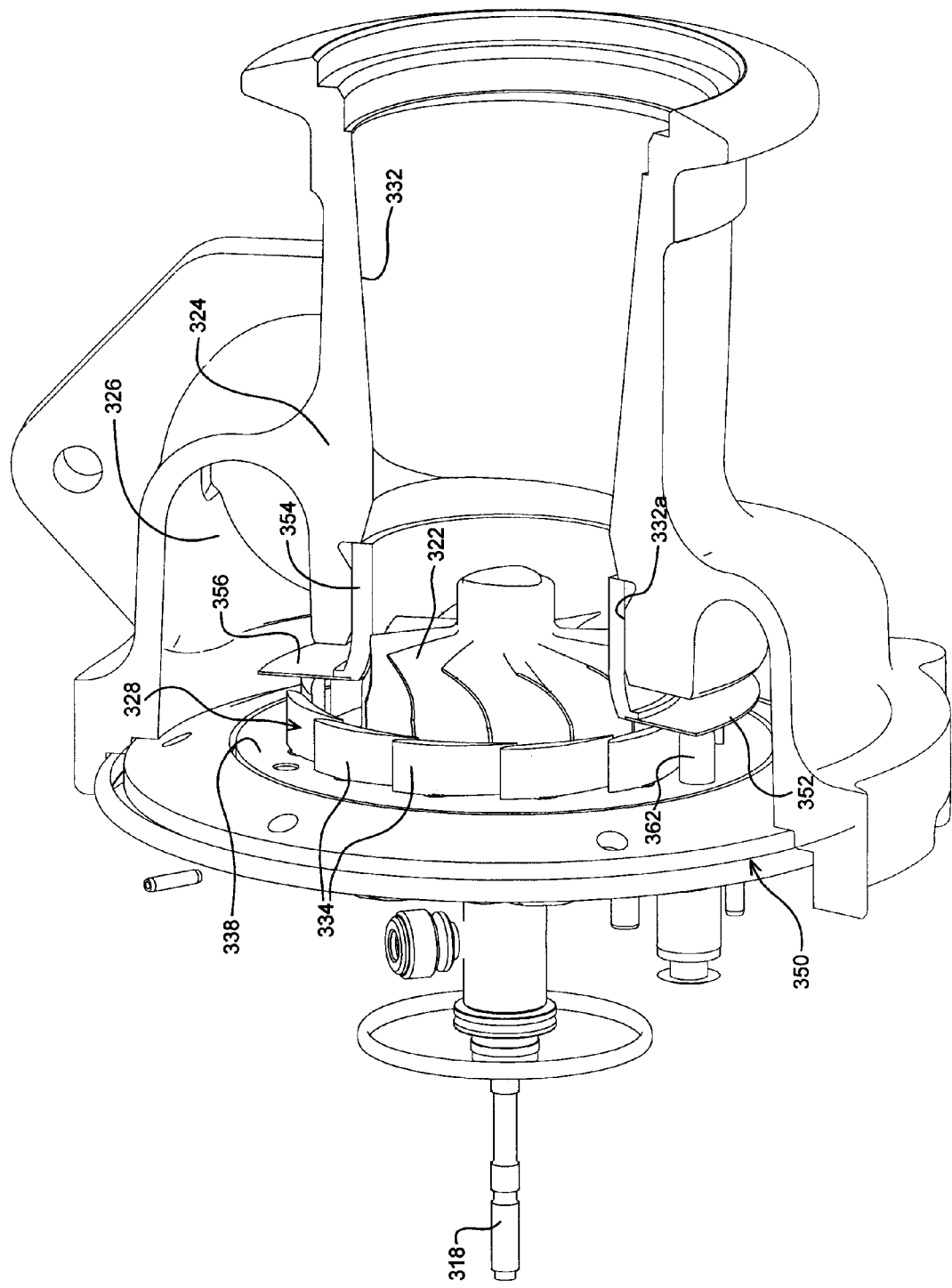
FIG. 6 is a partly sectioned perspective view of a turbocharger variable-nozzle turbine in accordance with a third embodiment of the invention.
Figure 7:
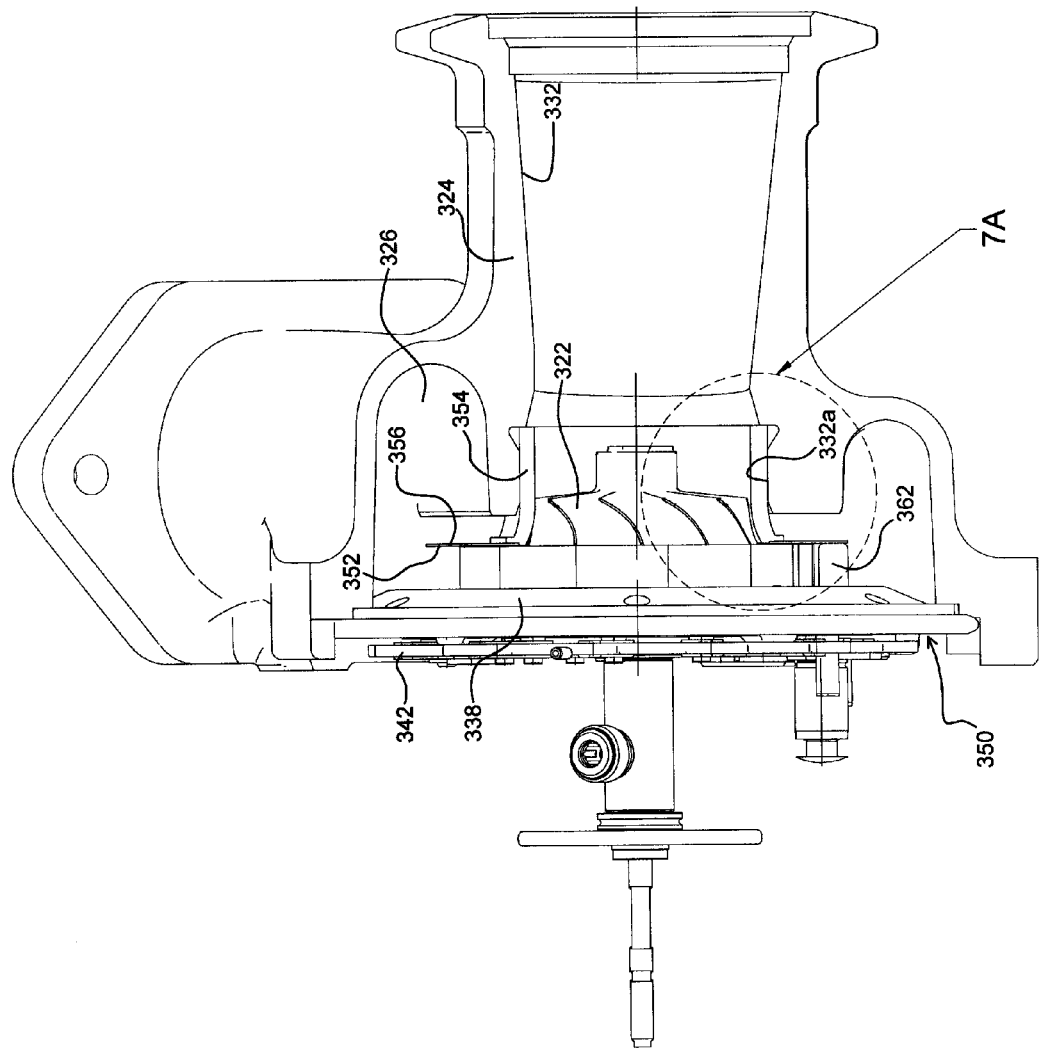
FIG. 7 is a side view, partly in section, of the variable-nozzle turbine of FIG. 6.
Figure 7A:
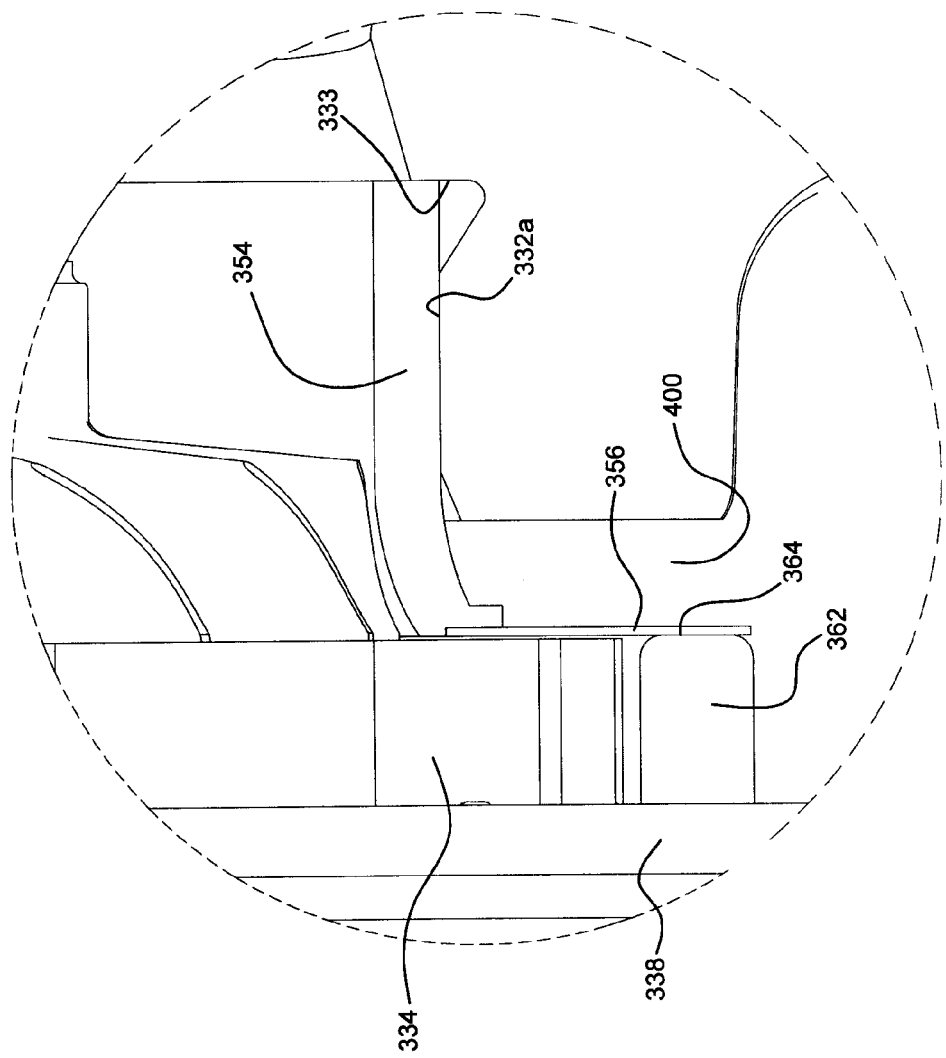
FIG. 7A is a magnified view of a portion of FIG. 7.

A third embodiment of the invention is illustrated in FIGS. 6, 7, and 7A. FIG. 6 depicts a turbine having a turbine wheel 322 mounted on a shaft 318 and disposed in a turbine housing 324 that defines a generally annular chamber 326. A turbine nozzle 328 leads from the chamber 326 radially inwardly to the turbine wheel. A variable-vane assembly or cartridge 350 is assembled with the turbine housing. The variable-vane assembly 350 includes a plurality of circumferentially spaced vanes 334 rotatably mounted to a nozzle ring 338 and actuated by a unison ring 342, and a pipe 352 inserted into a portion 332a of the bore 332 in the turbine housing.

The pipe 352 includes a tubular portion 354 that extends axially and is press-fit into the bore portion 332a, and an annular flange portion 356 that extends generally radially outwardly from one end of the tubular portion. The flange portion 356 forms one wall of the turbine nozzle 328 opposite from the wall formed by the nozzle ring 338. The pipe 352 also forms the contour that is radially adjacent to the outer tips of the blades of the turbine wheel 322. In accordance with the third embodiment of the invention, the pipe 352 is a gas pressure-responsive member that is arranged to be axially movable relative to the vanes 334 for controlling the clearance between the ends of the vanes 334 and the adjacent surface of the pipe 352. To this end, the flange portion 356 is elastic such that the flange portion 356 can undergo axial movement with respect to the vanes, under the action of differential gas pressure. With reference to FIG. 7A, there is a dead-headed space 400 between the back side of the flange portion 356 of the pipe and the adjacent end of the turbine housing 324, and in this space the exhaust gas from the turbine housing chamber 326 is essentially stagnated such that its static pressure is higher than the static pressure of the exhaust gas flowing through the nozzle 328 on the front side of the flange portion 356. Accordingly, there is a gas pressure differential exerted on the flange portion 356 (directed to the left in FIG. 7A) that tends to urge the flange portion toward the ends of the vanes 334. In order to prevent the flange portion 356 from contacting the ends of the vanes, there are spacers 362 mounted on the nozzle ring 338, and the spacers define a shoulder or stop 364 that is abutted by the flange portion under the action of the gas pressure differential. When the flange portion abuts the stop 364 there is still a non-zero value of clearance between the flange portion and the ends of the vanes 334.

As best seen in FIG. 7A, the portion 332a of the bore into which the tubular portion 354 of the pipe is press-fit defines an axially facing hard stop 333 for the end of the tubular portion opposite from the end from which the flange portion 356 extends, and the opposite end of the tubular portion abuts the hard stop.

In accordance with the third embodiment of the invention, the tubular portion 354 of the pipe has a substantially greater rigidity than the flange portion 354. For example, the tubular portion 354 can be a cast or machined metal tube and the flange portion 356 can be an annular sheet metal part that is affixed (e.g., by welding) to the tubular portion.

Figure 8:
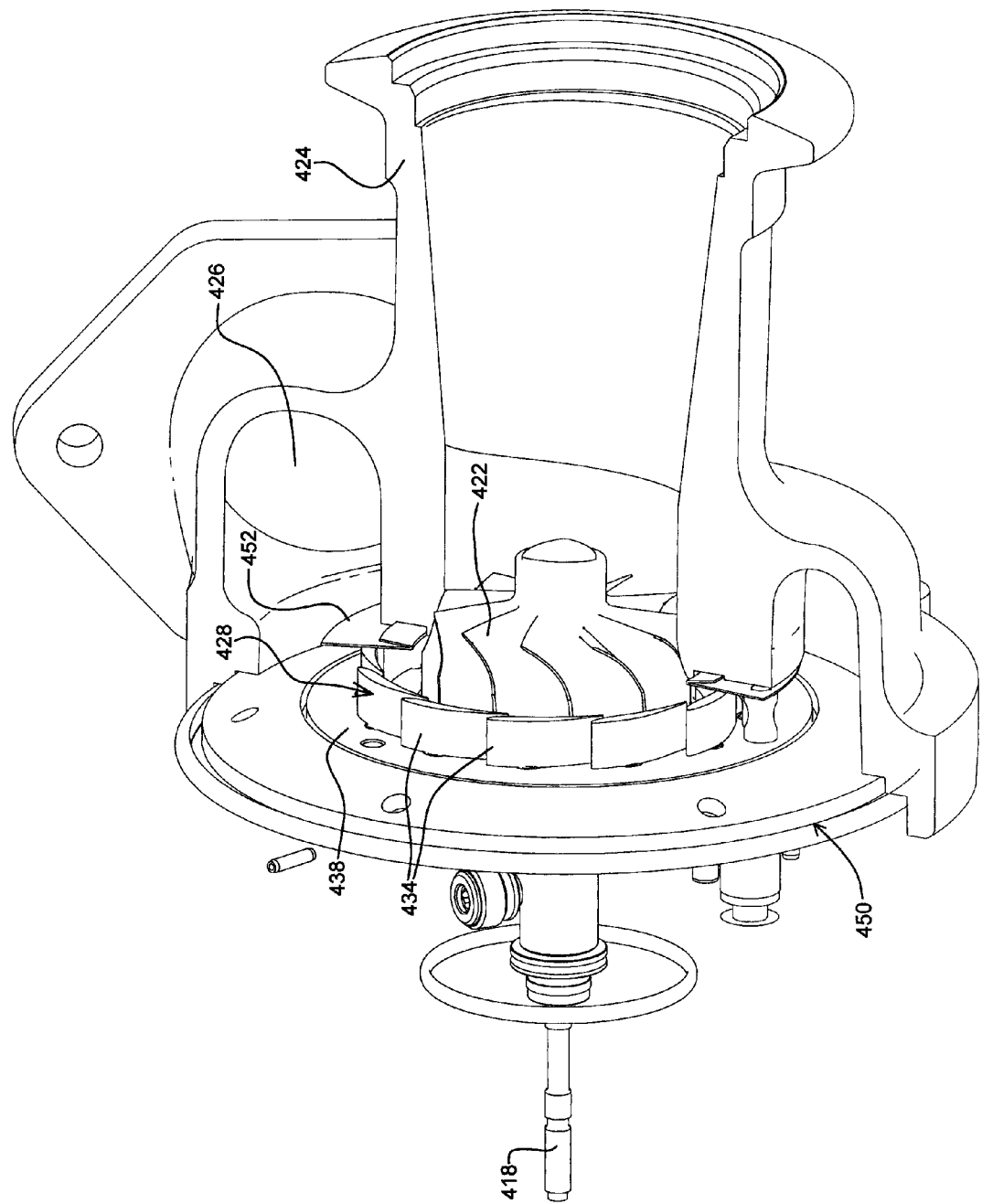
FIG. 8 is a partly sectioned perspective view of a turbocharger variable-nozzle turbine in accordance with a fourth embodiment of the invention.
Figure 9:
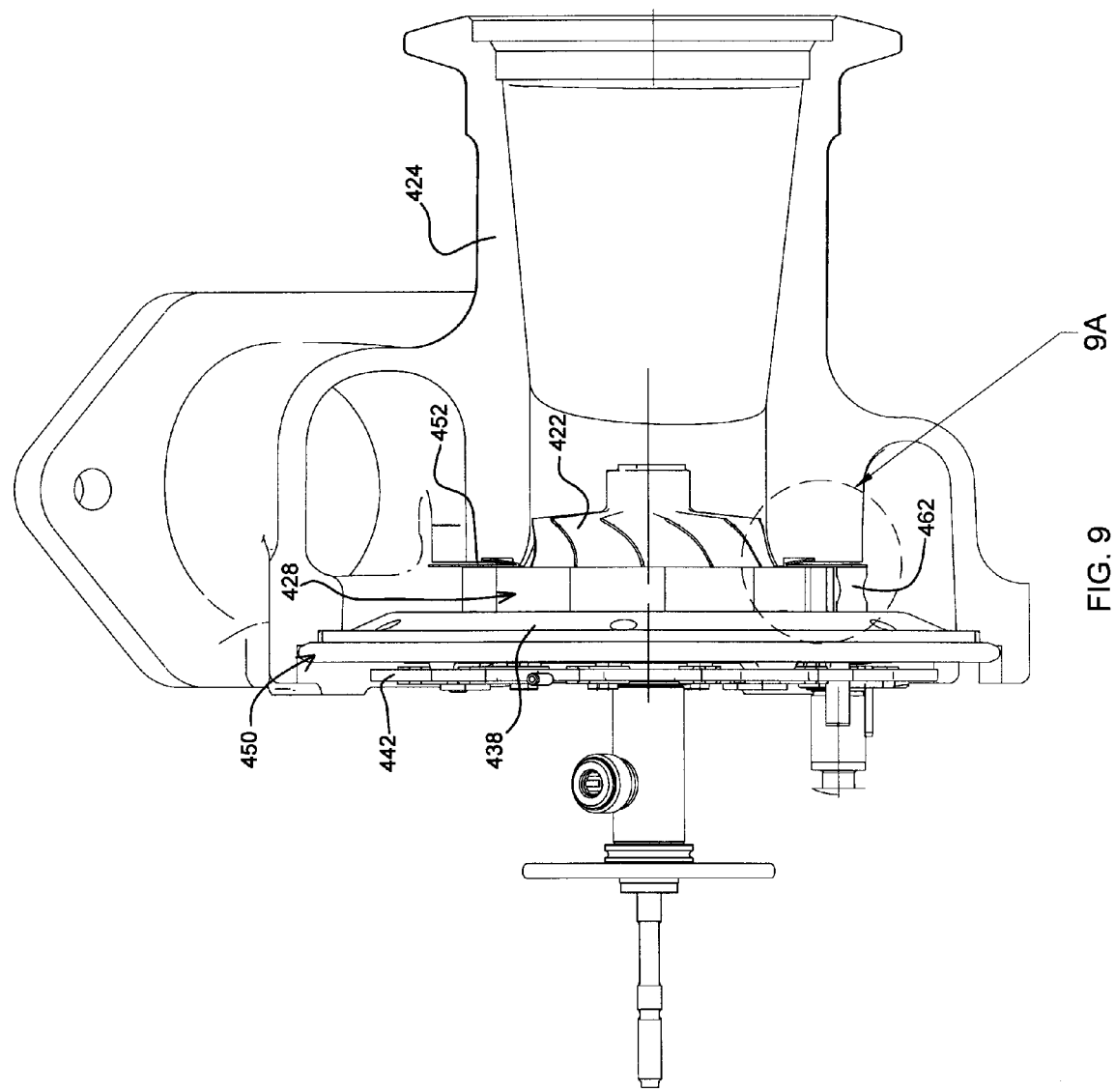
FIG. 9 is a side view, partly in section, of the variable-nozzle turbine of FIG. 8.

A fourth embodiment of the invention is now described with reference to FIGS. 8, 9, and 9A. FIG. 8 depicts a turbine having a turbine wheel 422 mounted on a shaft 418 and disposed in a turbine housing 424 that defines a generally annular chamber 426. A turbine nozzle 428 leads from the chamber 426 radially inwardly to the turbine wheel. A variable-vane assembly or cartridge 450 is assembled with the turbine housing. The variable-vane assembly 450 includes a plurality of circumferentially spaced vanes 434 rotatably mounted to a nozzle ring 438 and actuated by a unison ring 442, and an insert 452 forming a gas pressure-responsive member. In accordance with this embodiment, the turbine housing 424 forms the contour that is adjacent the outer tips of the turbine wheel blades, and the gas pressure-responsive member comprises an annular elastically resilient insert 452 abutting a surface defined by the turbine housing 424. The insert 452 has one side adjacent the vanes 434 and an opposite side exposed to exhaust gas from the chamber in a substantially stagnated state in the dead-headed space 500 (FIG. 9A), such that a gas pressure differential exerts pressure on the insert to increase a contact force between the insert and the turbine housing and to urge the insert against a first stop 464 formed by spacers 462 affixed to the nozzle ring 438. The insert can comprise a sheet metal part.

Figure 9A:
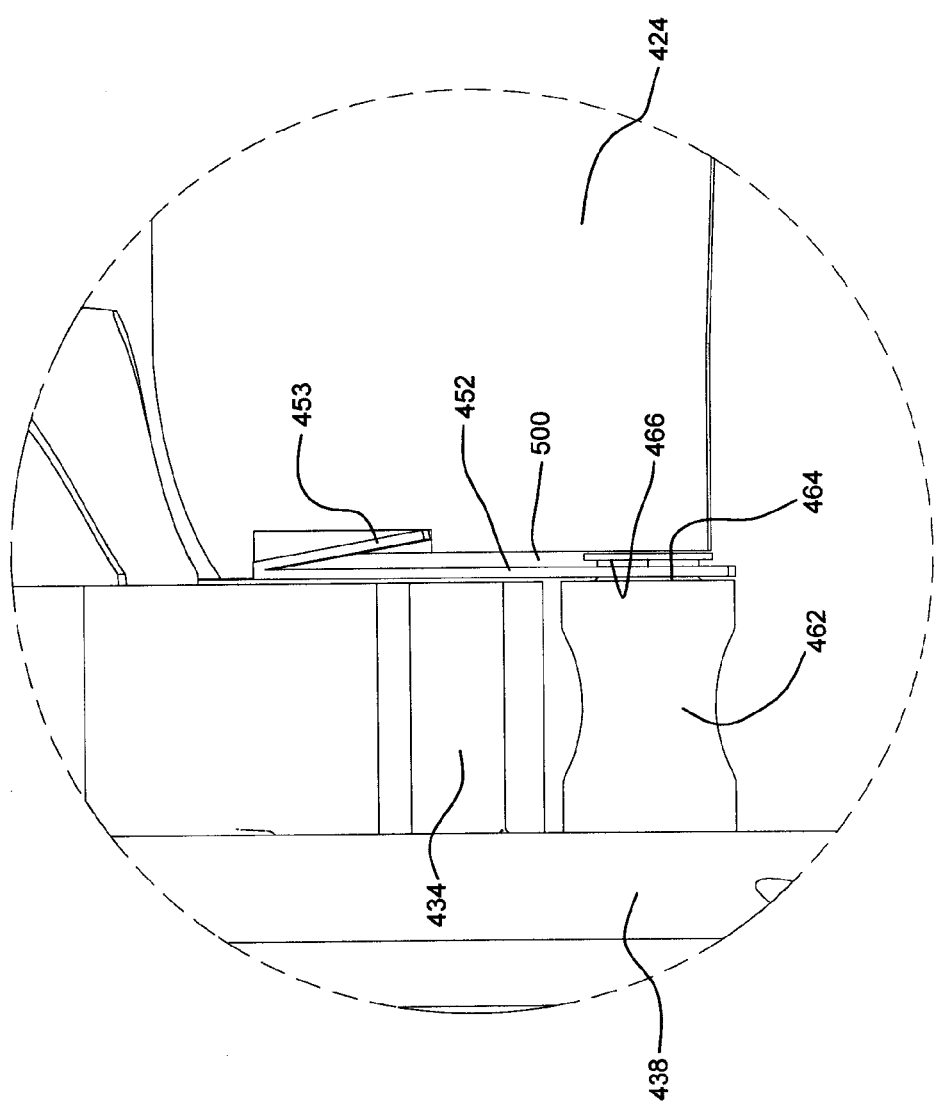
FIG. 9A is a magnified view of a portion of FIG. 9.

As best seen in FIG. 9A, each spacer 462 has a reduced-diameter portion that extends through an opening in the insert 452. The spacers also define a second stop 466 formed by enlarged heads on the ends of the reduced-diameter portions, such that the insert is limited in axial movement away from the first stop 464 by abutment against the second stop 466.

As illustrated, the insert includes a bent portion 453 forming a spring extending from the opposite side of the insert and abutting the surface of the turbine housing.

In the various embodiments of the invention (both those described herein and other variations made obvious by the present disclosure), the described pipe seal design and layout are potentially advantageous to turbine performance at low engine speed by reducing the impact of leakage through the vane side clearance and between the pipe and turbine housing. Regarding the pipe/housing sealing, embodiments of the invention provide a small contact between the elastic member and the turbine housing and additionally the gas pressure differential effect can further improve the sealing. Regarding the vane side clearance leakage, this can be minimized by managing the vane clearance near to zero (the minimum clearances to be optimized versus hysteresis behavior in order to minimize the load on the vanes) while keeping the maximum clearance at a level to maintain acceptable turbine performance.

The movement capability of the pipe/insert can also help alleviate the risk of the vanes becoming stuck as a result of the build-up of deposits (chiefly, soot from the exhaust gases) over time during the service life of the turbocharger. With the prior-art design having a non-movable rigid pipe, at the beginning of the service life the vane clearance is a maximum and there is no sticking risk; as the time in service progresses, deposits build up until there is no clearance anymore, which results in improved performance but there is a potential sticking risk. In accordance with the present invention, at the beginning of service life the vane clearance can be smaller than in the prior-art design, resulting in better performance right from the beginning; as time in service progresses, deposits build up and reduce the clearance, which further improves the performance, but the pipe/insert's movability is thought to alleviate or delay the risk of vane sticking because the pipe/insert is continually undergoing axial movements relative to the vanes over the course of engine cycles during service.

Persons skilled in the art, on the basis of the present disclosure, will recognize that modifications and other embodiments of the inventions described herein can be made without departing from the inventive concepts described herein. Specific terms used herein are employed for explanatory purposes rather than purposes of limitation. Accordingly, the inventions are not to be limited to the specific embodiments disclosed, and modifications and other embodiments are intended to be included within the scope of the appended claims.

What is claimed is:

1. A turbocharger, comprising:
   a compressor comprising a compressor housing and a compressor wheel disposed in the compressor housing;
   a turbine housing defining a bore extending axially through the turbine housing and defining an exhaust gas inlet and an annular chamber that receives exhaust gas via the exhaust gas inlet, the annular chamber extending circumferentially about the bore, and a turbine wheel disposed within the turbine housing and arranged for receiving exhaust gas from the annular chamber and expanding the exhaust gas and discharging the exhaust gas into the bore, the compressor wheel and the turbine wheel being affixed to opposite ends of a shaft;
   a turbine nozzle extending from the annular chamber radially inwardly to the turbine wheel, the turbine nozzle being defined between a first wall and a second wall axially spaced wall from the first wall, and a contour adjacent a radially outer periphery of the turbine wheel and transitioning from the turbine nozzle into the bore;
   a variable-vane assembly comprising a fixed nozzle ring and a plurality of circumferentially spaced vanes rotatably mounted on the nozzle ring such that the vanes are each rotatable about respective vane pivot axes, the nozzle ring defining the first wall of the turbine nozzle, the vanes being disposed in the turbine nozzle, each vane having a first end adjacent the first wall and a second end adjacent the second wall;
   a gas pressure-responsive member that is arranged to be axially movable relative to the vanes, the gas pressure-responsive member comprising a pipe having a tubular portion that extends axially and an annular flange portion that extends radially outwardly from one end of the tubular portion, the flange portion forming the second wall of the turbine nozzle, the pipe forming said contour;
   an elastic member affixed to the pipe and disposed between the pipe and a portion of the turbine housing such that a dead-headed space is created between a back side of the flange portion and the turbine housing, in which said dead-headed space the exhaust gas from the annular chamber is substantially stagnated such that a static pressure in said dead-headed space is higher than a static pressure of the exhaust gas flowing through the turbine nozzle on an opposite front side of the flange portion so as to urge the pipe axially toward the nozzle ring, and wherein one side of the elastic member is exposed to said static pressure in said dead-headed space to increase a contact force between the elastic member and the portion of the turbine housing, wherein the elastic member is annular having a radially outer edge and a radially inner edge, and wherein one end of the elastic member defined by the radially inner edge is affixed to the pipe and an opposite end of the elastic member defined by the radially outer edge engages the portion of the turbine housing; and a first stop positioned so that the flange portion of the pipe which is urged axially toward the nozzle ring is stopped by the first stop from contacting the second ends of the vanes, so that there is a non-zero first value for a clearance between the second ends of the vanes and the flange portion.

2. The turbocharger of claim 1, wherein the elastic member is affixed to the tubular portion of the pipe.

3. The turbocharger of claim 2, wherein the elastic member is press-fit onto the tubular portion.

4. The turbocharger of claim 1, wherein the elastic member is a resilient metal part.

5. The turbocharger of claim 1, wherein the elastic member is pre-compressed between the turbine housing and the pipe so as to urge the pipe toward the first stop in the absence of differential gas pressure on the pipe.

6. The turbocharger of claim 1, wherein the first stop is provided by spacers rigidly affixed to the nozzle ring and extending axially from the nozzle ring toward the flange portion of the pipe.

7. The turbocharger of claim 6, wherein each spacer extends through an opening in the flange portion of the pipe.

8. The turbocharger of claim 7, wherein the spacers define a second stop for the flange portion, the flange portion being limited in axial movement away from the first stop by abutment against the second stop.

9. The turbocharger of claim 1, wherein the pipe is substantially rigid.

10. The turbocharger of claim 1, wherein the pipe is a stamped sheet metal part.

* * * * *